United States Patent
Shambeau et al.

[11] Patent Number: 6,102,469
[45] Date of Patent: Aug. 15, 2000

[54] SLING LOAD PORTAL FOR CARGO BOX

[75] Inventors: Thomas Allan Shambeau, Beaver Dam, Wis.; Loren Fredrick Hansen, Lincoln, Nebr.

[73] Assignee: Deere & Company, Moline, Ill.

[21] Appl. No.: 09/292,490

[22] Filed: Apr. 15, 1999

[51] Int. Cl.[7] .................................................. B62D 33/02
[52] U.S. Cl. .......................................... 296/183; 296/204
[58] Field of Search .................................. 296/183, 35.3, 296/204; 280/762; 410/112

[56] References Cited

U.S. PATENT DOCUMENTS

| | | | |
|---|---|---|---|
| 2,915,334 | 12/1959 | Barenyi | 296/204 |
| 3,021,166 | 2/1962 | Kempel et al. | 280/762 X |
| 3,550,343 | 12/1970 | Buske | 410/112 X |
| 5,378,094 | 1/1995 | Martin et al. | 410/112 |

OTHER PUBLICATIONS

John Deere, Military Gator Utility Vehicle brochure, 2 pages, published Mar. 1998 in U.S.A.

Chapter from book of unknown title, Thin–skinned Vehicles–Truck, 10 pages, publication date and country unknown.

U.S. Department of The Army, Field Manual 10–450–4, Multiservice Helicopter Sling Load: Single–Point Load Rigging Procedures, publication date unknown (supersedes FM55–450–4 published Feb. 11, 1991), published in U.S.A.

*Primary Examiner*—Dennis H. Pedder

[57] ABSTRACT

A vehicle includes a bed having an opening through which a sling leg may be passed. A sling load portal includes the opening and a door mounted under the bed and movable between a closed position wherein the door is in registration with the opening and an open position wherein the door is removed from registration with the opening, providing a path through the bed to a lift provision connected to the frame of the vehicle.

18 Claims, 3 Drawing Sheets

SLING LOAD PORTAL FOR CARGO BOX

BACKGROUND OF THE INVENTION

1. Field of the Invention

The present invention relates to hauling vehicles having frame-mounted cargo boxes and more particularly relates to structure for sling loading of such vehicles. A preferred embodiment of the present invention relates to a sling load portal including a selectively sealable opening in the bed of the cargo box of a utility vehicle.

2. Description of Related Art

Various hauling vehicle designs are known which include a cargo box having side walls and a tailgate which forms a rear wall thereof.

Utility vehicles such as the vehicle described herein are often adapted to be used in off-road conditions It is well known that such vehicles have also been modified for use in providing emergency medical treatment and transport. To position a utility vehicle in a particular off-road location (for example, to an area from which transportation of injured persons is required), it may be necessary or desirable to bring the vehicle there by a method other than its own power.

The sling load method of carrying vehicles ("sling loading") involves the rigging of the vehicle by fastening a sling comprising a set of sling legs (chains, cables, ropes or other straps) to multiple points about the vehicle, typically at or near corners of vehicle The sling legs are gathered at central point above vehicle from which the vehicle will be lifted. The sling is in turn fastened to a cargo hook attached to a piece of equipment such as a crane or aircraft such as a helicopter. Sling loading cargo and equipment overcomes many of the obstacles that hinder other modes of movement. In military operations in particular, helicopter sling loading is used extensively in the ship-to-shore movement of cargo and equipment during amphibious operations, movement of supplies and equipment over the battlefield, vertical replenishment of ships, and firepower emplacement. The advantages of the sling load method include the ability to bypass surface obstacles to effect the rapid relocation of supplies and equipment.

In order to lift a vehicle by sling loading, it is normally desirable to attach the sling to the sturdiest part of the vehicle, which is the frame. Accordingly, lift provisions such as pivotable rings, shackles, eyelets, lugs, and loops are commonly fastened to the frame, serving as a location for attaching a sling or other lifting mechanism (the lift provisions may also be used to tie the vehicle down to a platform or other surface).

Sling loading a utility vehicle having a cargo box is particularly problematic because the cargo boxes of such vehicles are typically substantially larger than the frame of the utility vehicle itself, so that the lift provisions attached to the frame are located beneath the cargo box. When sling legs are used to rig the vehicle for sling loading, they must pass over the tailgate or the sidewalls of the cargo box. As force is applied to lift the vehicle, the straps will have the tendency to pull the cargo box off the vehicle. Cargo boxes of utility vehicles in particular are designed for carrying weight within the box so that force is transferred downward to the vehicle frame upon which the box is mounted. Upward force on the box is typically resisted only by the shear strength of pivots (commonly two bolts) which allow the box to tilt for unloading. During sling loading, the straps will also tend to deform sidewalls or the tailgate of the cargo box. In addition, abrasion between the sling legs and the sides of the cargo box may remove the paint from the vehicle and possibly damage the sling legs.

SUMMARY OF THE INVENTION

An object of the invention is to provide a sling load portal structure for sling loading a vehicle having a cargo box that overcomes the disadvantages of the prior art structures.

It is another object of the invention to provide such a structure that reduces force applied to the cargo box during sling loading.

A further object of the invention is to provide such a structure that will not materially affect normal use of the cargo box.

An additional object of the invention is to provide such a structure that may be manufactured inexpensively.

Yet another object of the invention is to provide such a structure which will perform its operation reliably, even in dirty or otherwise contaminated environments.

These and other objects are achieved by the subject invention which comprises a vehicle having a frame and a cargo box mounted thereon. Lift provisions are attached to the frame for supporting the weight of the vehicle as it is suspended by a set of sling legs. A sling load portal is provided which includes an opening in the bed of the cargo box and a door secured beneath the bed for selectively sealing the opening.

The subject portal is analogous to a trap door in the bed of the cargo box, specifically for the purpose of accessing lift provisions below the cargo box for lifting the vehicle. The portal door is normally closed, sealing the opening in the bed and preventing the cargo from readily passing through the opening so that the cargo may be effectively carried in the cargo box. When it is desirable to lift the vehicle, as by sling loading, portal door can be swung open to expose the opening and a resultant path through the bed to the associated lift provision. A sling leg may then be fed through the opening in the cargo box and attached to the ring.

In a preferred embodiment, the door is pivotally mounted beneath an opening in the cargo bed by a simple nut and bolt assembly, with a spring washer provided on the pivot bolt to apply friction to prevent accidental movement of the door. When it is not in use, the door is simply pivoted closed. A bearing surface in the form of an angle bracket is positioned underneath the opening hole so that the sling leg will make little or no contact with the edge of the opening and will put most of the load into the main frame. When the vehicle is lifted, very little load will be placed on the cargo box itself. A support bracket configured as a welded metal plate is provided below the door as considered in its closed position so that if substantial weight is placed on the door, the door will bear on the support bracket to prevent overloading the pivot bolt. Tab portions are provided on the door and on the support bracket, adjacent each other when the door is in its closed position so that, if necessary, a screwdriver or pry bar can be inserted between the two tabs to pry the door open.

Other objects and advantages of the present invention will be apparent upon reading the following detailed description and accompanying drawings.

Figure 2:
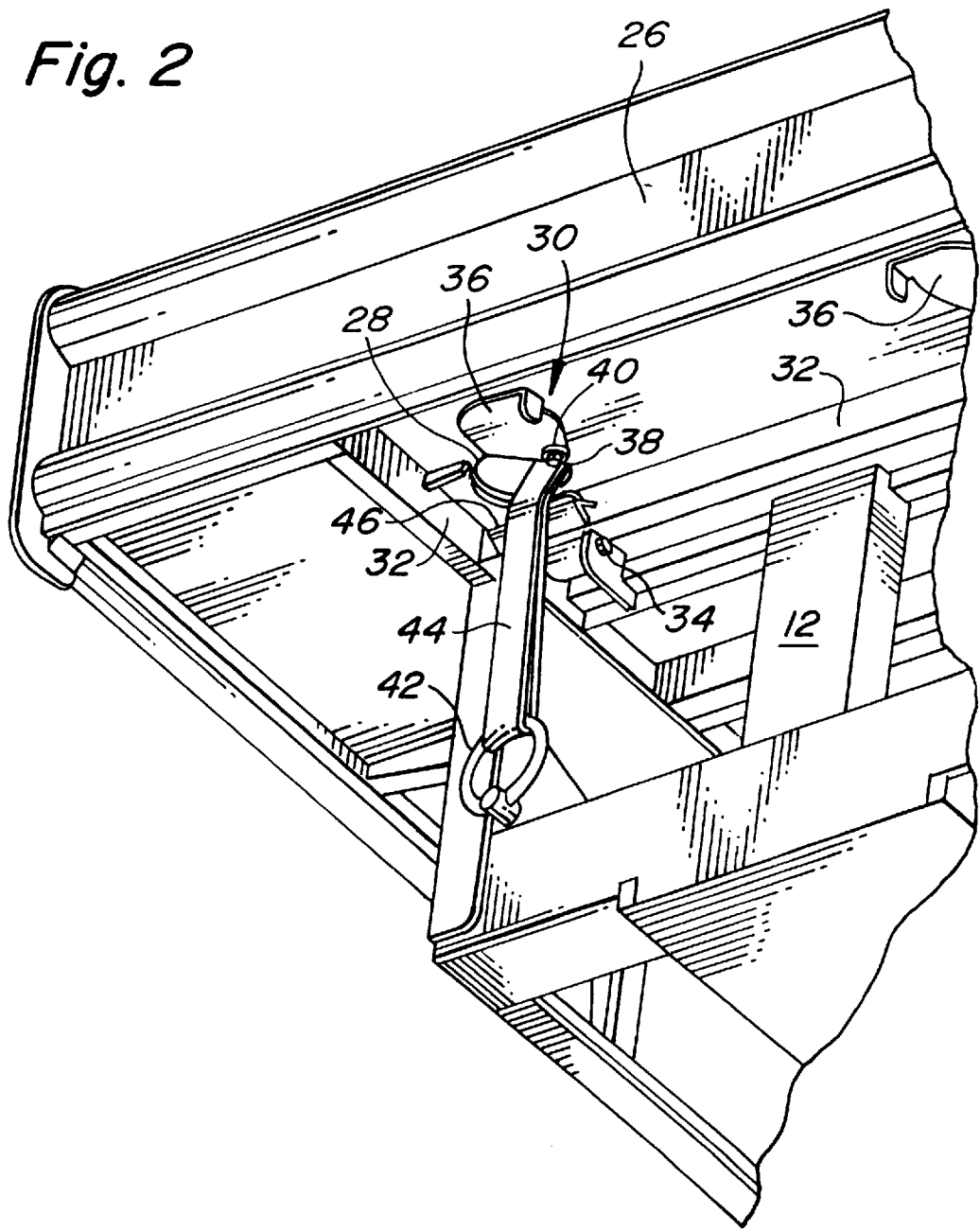
FIG. 2 is a fragmentary worm's eye view of the utility vehicle showing one of the sling load portals of FIG. 1 including a door in its open position wherein a strap is shown extending therethrough to a lift provision attached to a frame of the utility vehicle.
Figure 3:
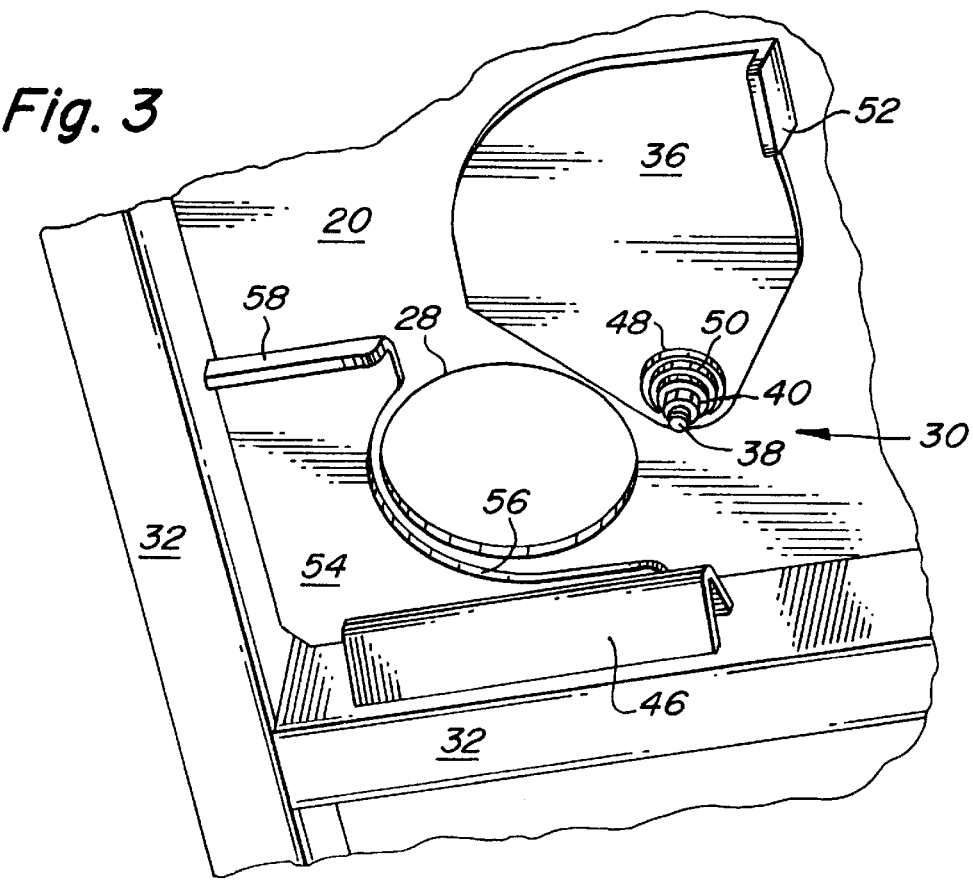
Figure 4:
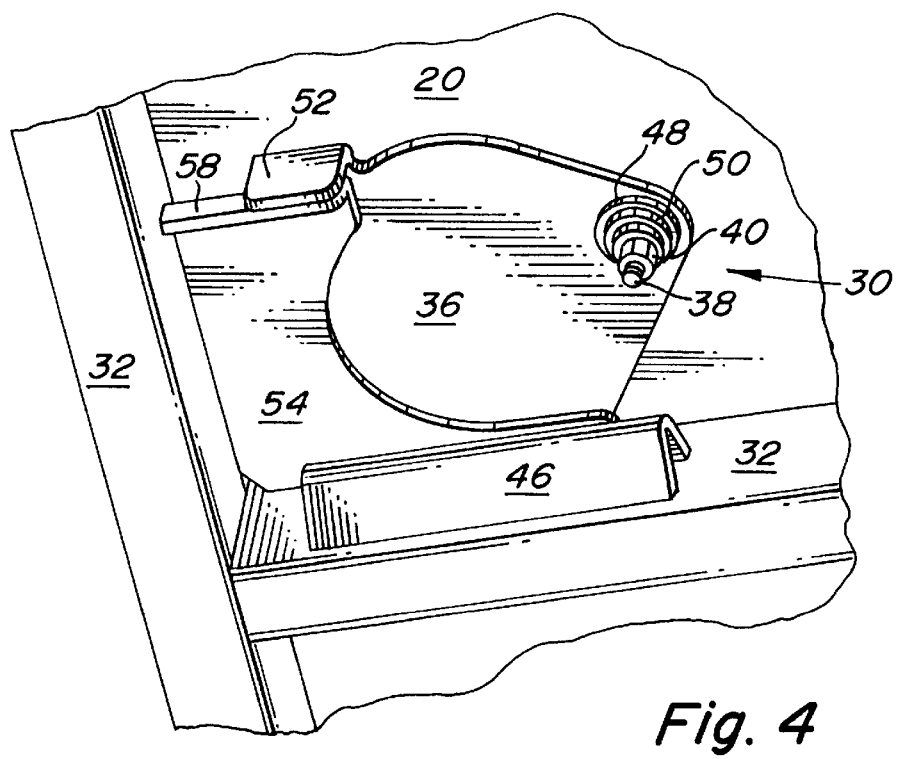

FIG. 3 is an enlarged fragmentary worm's eye view of the sling load portal of FIG. 2; and FIG. 4 is an enlarged fragmentary worm's eye view of the sling load portal of FIG. 2 showing the door in its closed position.

DESCRIPTION OF THE EXEMPLARY EMBODIMENT

Figure 1:
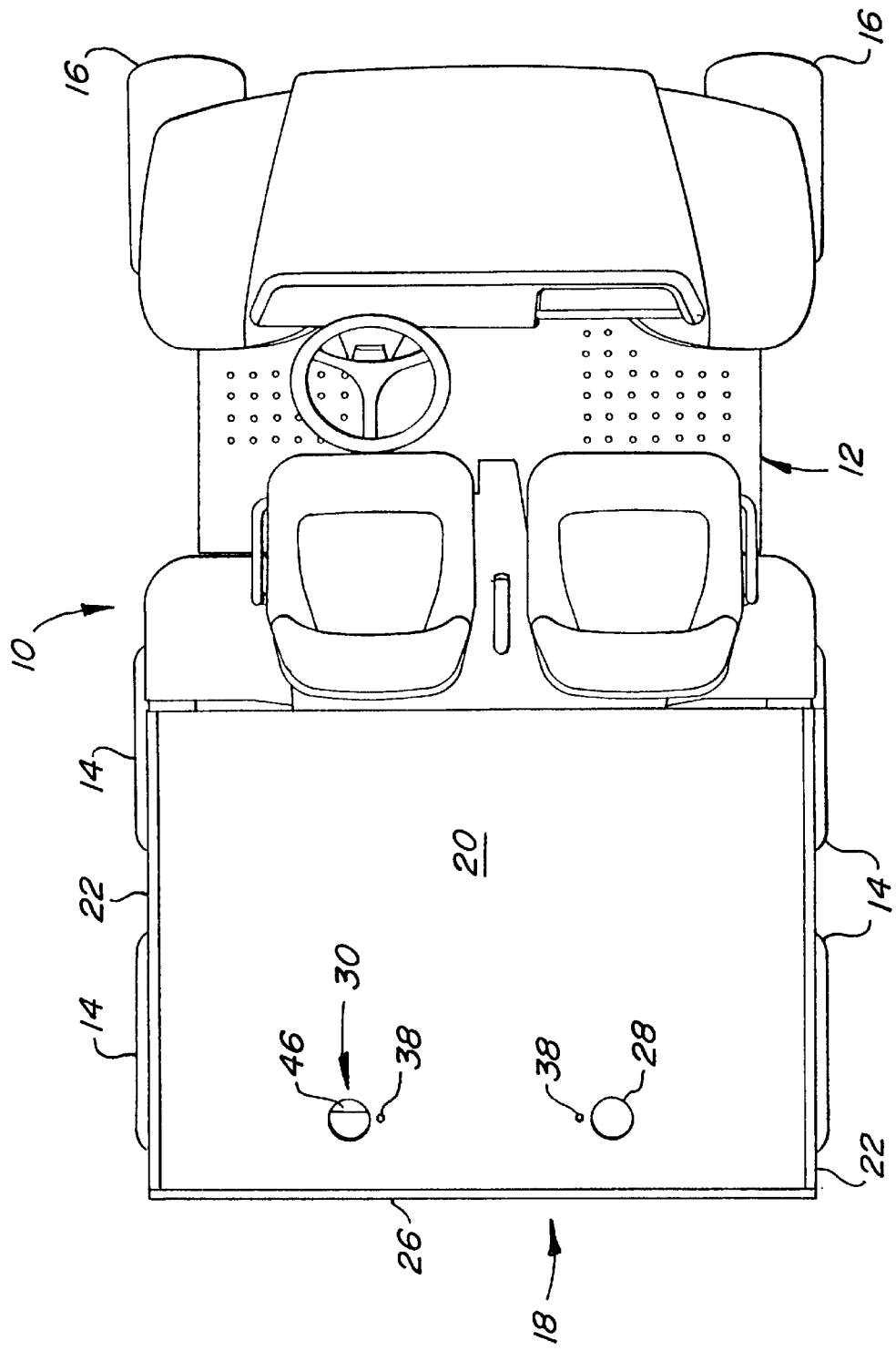
FIG. 1 is a plan view showing a utility vehicle including a cargo bed provided with two sling load portals constructed according to the present invention.

FIG. 1 shows a utility hauling vehicle 10 including a main frame 12 supported by four drive wheels 14 and a pair of steerable front wheels 16. Supported on the frame 12 in a location above the drive wheels 14 is a cargo box 18. The box 18 includes a horizontal floor or bed 20 and vertical right and left sidewalls 22, a front wall 24 and a tailgate 26. The tailgate 26 forms a rear wall of the box 18 and is mounted for selectively closing the opening defined by the rear edges of the bed 20 and the sidewalls 22. The sidewalls 22 are also mounted for pivoting about horizontal axes. In this manner, the sidewalls 22 and the tailgate 26 may be pivoted from closed, upright positions to open, recumbent positions wherein they effectively become extensions of the bed 20 and the cargo box 18 may be thereby converted to a flat bed (not shown). The bed 20 is provided with spaced-apart openings 28 associated with sling load portal assemblies 30.

A rear worm's eye view of the vehicle 10 is shown in FIG. 2. The cargo box 18 includes a series of cargo box frame rails 32 beneath the bed 20. The cargo box frame rails 32 rest on the main frame 12 of the vehicle 10. The cargo box 18 is mounted to the frame 20 by a pair of axially aligned bolts 34 (the left-hand bolt 34 is shown in FIG. 2) which form an axis of rotation about which the cargo box 18 may pivot. The sling load portal assembly 30 comprises the opening 28 in the bed 20 and a door 36 which is pivotally attached to the bed 20 by a fastener such as a carriage bolt 38 which is engaged by a nut 40.

A pivotable ring 42 serves as a lift provision which cooperates with similar lift provisions provided at other locations around the frame 12 of the vehicle 10 to provide points B of engagement for sling legs such as strap 44 so that the vehicle may be lifted by the strap 44 and other sling legs.

The door 36 is shown in its open position (out of alignment with the opening 28) so that a path is provided through the bed 20 from the ring 42 to the area above the cargo box 18. The strap 44 is passed through the opening 28 and through the ring 42, after which the strap 44 is passed back through the opening 28. The strap 44 will then typically be coupled with other sling legs at a central location (although multiple point sling loading is also possible) above the vehicle 10 and coupled with a cargo hook on machinery such as a helicopter (not shown) for lifting and moving the vehicle 10.

The path created by the sling load portal assembly 30 through the bed 20 obviates the need to pass the strap 44 around the bed 20 and the tailgate 26 or sidewall 22 to achieve a connection between the lift ring 42 and the central location above the vehicle 10. Use of the sling load portal assembly 30 when sling loading the vehicle 10 therefore reduces resultant upward force on the cargo box 18, as the path through the bed 20 is more direct than an alternative path around the tailgate 26.

Where it is not practicable to provide an absolutely straight path from the ring 42 to the central location above the vehicle 10 (due to obstruction by the frame 12 or other concerns), it may be desirable to provide the sling load portal assembly 30 with a bearing provision 46 such as that shown in the form of a piece of angle iron welded to one of the frame rails 34. The bearing provision 46 extends below the opening (as seen in FIGS. 1 and 2), reducing or eliminating contact between the strap 44 and the material of the bed 20 at the edge of the opening 28.

Looking now to FIG. 3, the portal assembly 30 is shown wherein the door 36 is in its open position so that the portal assembly 30 provides a path through the bed 20. The bolt 38 about which the door 36 pivots is provided with a flat washer 48 and a spring washer 50. The spring washer 50 provides resistance adjustable by tightening the nut 40 so that a desired amount of effort will be required to pivot the door 36, preventing accidental shifts between open and closed positions. A tab portion 52 extends downwardly from the door 36 as a convenient location for an operator to grasp the door 36 for effecting a desired movement of the door 36.

Referring now to FIG. 4, the portal assembly 30 is shown in its closed position wherein the door 36 is pivoted into registration with the opening 28, substantially sealing the opening 28. A support bracket 54, configured as metal plate welded to the frame rails 32, is positioned below the door 36 as considered in its closed position. Preferably, the support bracket 54 is positioned so that only a small gap will exist between the door 36 and the support bracket 54 so that if substantial weight is placed on the door 36 from above, the door 36 will bear on the support bracket 54 to prevent overloading and bending or breaking the bolt 38 which attaches the door 36 to the bed 20. An inner contour 56 of the support bracket is preferably shaped so that the support bracket 54 will not overlap the opening 28 or otherwise interfere with operation of the portal assembly 30 when the door 36 is in its open position.

Infrequent use and exposure to inclement weather or other contamination may cause the door 36 to rust or otherwise bind in its closed position. In a preferred embodiment, the support bracket 54 will be provided with a downwardly extending tab 58. Preferably, the door 36 will achieve its closed position when the periphery of the 36 abuts one of the frame rails 32 so that tab 52 and tab 58 are spaced slightly apart. A tool such as a screwdriver or pry bar may then be inserted between the tabs 52, 58 to pry the door 36 open.

Although the invention is described with reference to an illustrative embodiment, it will be understood by those skilled in the art that the invention may be advantageous in the form described as modified for use in other applications. The present invention should not be limited by the above-described embodiments, but should be limited solely by the claims that follow.

We claim:

1. A sling load portal assembly for a vehicle having a frame, and a lift provision connected to the frame, said sling load portal comprising:

a cargo bed supported on the frame, said cargo bed having an opening;

a door supported beneath the opening for relative movement between a closed position wherein the door is in registration with the opening and an open position where in the door is removed from registration with the opening for providing a path through the bed to the lift provision.

2. The sling load portal assembly of claim 1 wherein the door is supported for pivotal movement relative to the bed.

3. The sling load portal assembly of claim 2 additionally comprising a support bracket fixed beneath the door for supporting the door when the door is in its closed position.

4. The sling load portal assembly of claim 1 additionally comprising a bearing provision disposed beneath the cargo bed.

5. The sling load portal assembly of claim 4 wherein the cargo bed includes a frame rail and the bearing provision is attached to the frame-rail.

6. The sling load portal assembly of claim 5 wherein the bearing provision is configured as a piece of angle iron.

7. The sling load portal assembly of claim 1 wherein the door includes a tab projecting therefrom.

8. The sling load portal assembly of claim 7 wherein the support bracket includes a further tab projecting therefrom.

9. The sling load portal assembly of claim 8 wherein the tab and the further tab are spaced apart when the door is in its closed position.

10. A sling loading apparatus for lifting a utility vehicle in a sling, the sling comprising a plurality of sling legs which meet at a central point above the vehicle, the vehicle having a frame and a cargo bed mounted on and extending rearwardly beyond the frame, and the cargo bed having an opening therethrough, the sling loading apparatus comprising:

a plurality of lift provisions connected to the frame; and a door mounted to the cargo bed and movable between a closed position in overlapping alignment with the opening for substantially sealing the opening and an open position wherein the door is substantially removed from alignment with the opening for providing a path through the cargo box between one of the lift provisions and the central point.

11. The sling loading apparatus of claim 10 wherein the door is pivotally mounted to the bed.

12. The sling loading apparatus of claim 10 additionally comprising a support bracket fixed beneath the door for supporting the door when the door is in its closed position.

13. The sling loading apparatus of claim 10 additionally comprising a bearing provision disposed beneath the cargo bed.

14. The sling loading apparatus of claim 13 wherein the cargo bed includes a frame rail and the bearing provision is attached to the frame rail.

15. The sling loading apparatus of claim 14 wherein the bearing provision is configured as a piece of angle iron.

16. The sling loading apparatus of claim 10 wherein the door includes a tab projecting therefrom.

17. The sling loading apparatus of claim 16 wherein the support bracket includes a further tab projecting therefrom.

18. The sling loading apparatus of claim 17 wherein the tab and the further tab are spaced apart when the door is in its closed position.

* * * * *